(12) United States Patent
Allen et al.

(10) Patent No.: US 8,972,939 B1
(45) Date of Patent: Mar. 3, 2015

(54) SYSTEMS AND METHODS FOR PROCESSING AND PRODUCING CONTENT FOR WEB SITES

(75) Inventors: Brad Allen, San Antonio, TX (US); Patrick Sturdivant, San Antonio, TX (US); Alan Brant Ramey, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1770 days.

(21) Appl. No.: 11/735,388

(22) Filed: Apr. 13, 2007

(51) Int. Cl.
G06F 9/44 (2006.01)

(52) U.S. Cl.
USPC ................... 717/124; 717/101; 717/102

(58) Field of Classification Search
None
See application file for complete search history.

(56) References Cited

U.S. PATENT DOCUMENTS

| | | | |
|---|---|---|---|
| 6,601,233 B1 * | 7/2003 | Underwood | 717/102 |
| 6,697,865 B1 * | 2/2004 | Howard et al. | 709/229 |
| 6,792,454 B2 * | 9/2004 | Nakano et al. | 709/219 |
| 7,716,077 B1 * | 5/2010 | Mikurak | 705/7.12 |
| 7,908,590 B1 * | 3/2011 | Min et al. | 717/124 |
| 8,010,627 B1 * | 8/2011 | Schneebeli et al. | 709/218 |
| 2001/0044834 A1 * | 11/2001 | Bradshaw et al. | 709/217 |
| 2002/0049697 A1 * | 4/2002 | Nakano et al. | 707/1 |
| 2003/0004746 A1 * | 1/2003 | Kheirolomoom et al. | 705/1 |
| 2003/0028419 A1 * | 2/2003 | Monaghan | 705/10 |
| 2003/0149742 A1 * | 8/2003 | Bollerud | 709/217 |
| 2003/0182652 A1 * | 9/2003 | Custodio | 717/122 |
| 2003/0225829 A1 * | 12/2003 | Pena et al. | 709/203 |
| 2004/0010772 A1 * | 1/2004 | McKenna et al. | 717/101 |
| 2004/0044555 A1 * | 3/2004 | Bangs et al. | 705/8 |
| 2004/0093594 A1 * | 5/2004 | Kapadia et al. | 717/170 |
| 2004/0117759 A1 * | 6/2004 | Rippert et al. | 717/100 |
| 2004/0143811 A1 * | 7/2004 | Kaelicke et al. | 717/101 |
| 2005/0034098 A1 * | 2/2005 | DeSchryver et al. | 717/101 |
| 2005/0044197 A1 * | 2/2005 | Lai | 709/223 |
| 2005/0102260 A1 * | 5/2005 | Spring et al. | 707/1 |
| 2005/0114784 A1 * | 5/2005 | Spring et al. | 715/762 |
| 2006/0161879 A1 * | 7/2006 | Lubrecht et al. | 717/101 |
| 2006/0174241 A1 * | 8/2006 | Celadnik et al. | 717/170 |
| 2007/0100712 A1 * | 5/2007 | Kilpatrick et al. | 705/29 |
| 2007/0100892 A1 * | 5/2007 | Kephart et al. | 707/200 |
| 2008/0028316 A1 * | 1/2008 | Schoning et al. | 715/733 |
| 2008/0034275 A1 * | 2/2008 | Edd et al. | 715/200 |
| 2008/0189679 A1 * | 8/2008 | Rodriguez et al. | 717/105 |

(Continued)

OTHER PUBLICATIONS

SAP, "mySAP Product Lifecycle Management," copyright 2001.*

(Continued)

Primary Examiner — Insun Kang
(74) Attorney, Agent, or Firm — Joseph A. Fuchs; Ungaretti & Harris LLP

(57) ABSTRACT

Mechanisms for the publication of web content are disclosed. Various stages can be used in a general publishing framework in moving content to publication. For instance, a development stage for the content can be used, where the development stage allows entities, such as developers, to code any materials associated with the content. Also, a testing stage can be used in order to test content developed in the development stage. Once these two stages are complete, a staging stage can be used for storing the content, and a production stage can be used for the actual publication of the content. Moreover, various interfaces can be used to allow entities to make requests to submit content and to log the state of such content in the framework. Lastly, various entities can collaborate on the publication of web content using the framework.

18 Claims, 11 Drawing Sheets

(56) References Cited

U.S. PATENT DOCUMENTS

2010/0293048 A1* 11/2010 Singolda et al. ............ 705/14.43
2012/0179780 A1* 7/2012 Spring et al. .................. 709/217

OTHER PUBLICATIONS

SAP, "mySAP Product Lifecycle Management Solution Map," 2004.*

Adobe Systems Incorporated, "Adobe Dreamweaver CS3," http://www.adobe.com/products/dreamweaver/, 2007, downloaded Apr. 10, 2007, 4 pages.

Amazon.com, Inc., "Web Easy Professional 6 Complete Web Design Studio," http://www.amazon.com/Easy-Professional-Complete-Design-Studio/dp/B000JX1NQI/ref=pd_bbs_sr_2/, 2007, downloaded Apr. 10, 2007, 5 pages.

Cosmi Corporation, "Total Website Creator 3 in 1," http://www.cosmi.com/OnlineStore/ProdDetails.aspx?Matnr=992000WEB, 2007, downloaded Apr. 10, 2007, 1 page.

Hewlett-Packard Development Company, L.P., "HP SorageWorks File Migration Agent Software—Overview," *HPinvent*, http://h18006.www1.hp.com/products/storage/software/fma/, 2007, downloaded Apr. 2, 2007, 2 pages.

Link Pro®, "Automated data movement & protection solutions," http://www.linkpro.com/, downloaded Apr. 2, 2007, 3 pages.

Microsoft Corporation, "Introducing Commerce Server 2007," *Microsoft*, http://www.microsoft.com/commerceserver/default.mspx, 2007, downloaded Apr. 2, 2007, 2 pages.

* cited by examiner

SYSTEMS AND METHODS FOR PROCESSING AND PRODUCING CONTENT FOR WEB SITES

BACKGROUND

Web content is growing at an accelerating pace. With the ever increasing expansion of Internet users who access web pages containing such content, mechanisms are need for facilitating the publishing of such content. Specifically, mechanisms are needed that allow for a platform or framework approach to publishing content, where a plurality of stages are used, whether development, testing, or production stages, that entities, whether individuals or computer programs, can access and submit such content to be published. Thus, it would be advantageous to provide such mechanisms that also at least at some level automate a portion of any content publishing project.

SUMMARY

In order to address the limitations of the prior art, in one aspect of the presently disclosed subject matter, various mechanisms are disclosed herein that seamlessly integrate a plurality of subsystems that process and produce content for web sites. For instance, requests for the production of content can be recorded. Then, various stages can be used in a general publishing framework in moving such content to publication. By way of example and not limitation, a development stage for the content can be used, where the development stage allows entities, such as developers, to code any materials associated with the content. Also, a testing stage can be used in order to test content developed in the development stage. Once these two stages are complete, a staging stage can be used for storing the content. This stage can be the penultimate stage before the actual publication, which may occur on the production stage. During the staging stage, content can be reviewed and approved (or disapproved), and during the production stage the content can be published. It is understood from the Detailed Description below, that the aforementioned requests to publish content can submitted along any stage of the publishing framework.

In another aspect of the presently disclosed subject matter, various mechanisms are disclosed for at least semi-automatically moving content along a publishing framework. For example, the publishing framework can provide a user friendly interface for submitting the content along any stage of the publishing framework, including the development stage, the testing stage, the staging stage, and the production stage. The interface can also provide controls for giving approval for any content that is submitted. Moreover, the interface can also keep a log of the content upon the granting of the approval to submit. Once entity interaction with interface is complete, any remaining tasks can be completed by the framework automatically.

In yet another aspect of the presently disclosed subject matter, various mechanisms are disclosed for publishing web content in a collaborative fashion. The publishing framework with a plurality of stages can be instantiated, where the aforementioned stages are variously configured to be used for publishing of the web content. Thus, a first interface can be provided to a first entity to submit a first portion of some web content, and a second interface can be provided to a second entity to submit a second portion of the web content. Then, the first entity and the second entity can collaborate on the publication of the web content using the publishing framework by submitting the first portion of the web content to a first stage of the plurality of stages, and the second portion of the web content to a second stage of the plurality of stages. The first and second stage can correspond to the same stage in the publishing framework, or to different stages. In short, the framework can be set up for the collaboration by entities who reside on a distributed network.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed or shown. The following figures are included.

DETAILED DESCRIPTION

Overview

Figure 1:
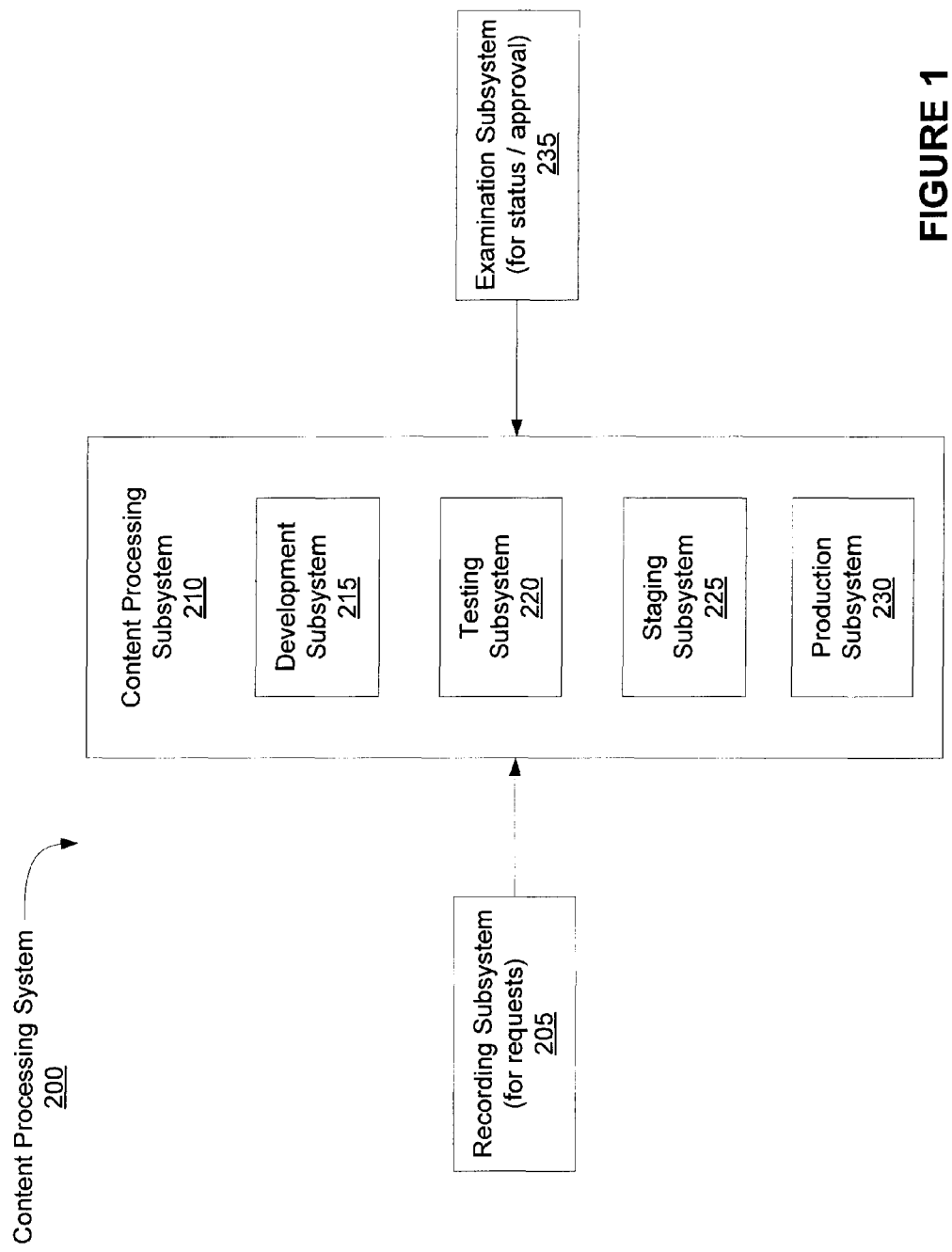
FIG. 1 provides a general overview of a content processing system for producing content, such as web sites, with the various exemplary and non-limiting stages of such a system.

A content processing system (CPS) and/or a content processing method (CPM) is disclosed for the processing of content as it is moved from development, to testing, to staging, and to production. For example, per FIG. 1, a CPS 200 may include a logging subsystem 205 that logs requests to produce content. This subsystem 205 can interface with a content processing subsystem (CPSS) 210 that comprises various other subsystems. By way of example and not limitation, the CPSS 210 can have a development subsystem 215 that allows developers to develop content, using a variety of computing languages or similar means for developing content (programs, applications, and the like). Additionally, the CPSS 210 can have a testing subsystem 220 that may allow for the testing of the developed content, in order to obtain the desired results. This subsystem 220 can be followed by a staging subsystem 225 that may allow for the storing of such developed content. Finally, the CPSS 210 may have a production subsystem 230 that publishes the developed content. Of course, it will be appreciated by those of skill in the art that other similar subsystems are contemplated herein acting in concert with the CPSS 210.

The CPSS 210 may not only interact with a logging subsystem 205, as mentioned above, but it may also interact with other subsystems, such as the examination subsystem 235 that allows for the checking of and/or approval of content being processed by the CPSS 210. Again, as will be appreciated by those of skill in the art, various other subsystems can interface with the CPSS 210, to the extent they are necessary or even useful for the overall CPS 200 to accomplish its goal of moving content to be published. In one exemplary and non-limiting scenario, such content can be web site content.

Aspects of System and Methods for Content Move

Various processes are integrated in the present disclosure to provide for the processing and production of content for various ends, such as, for example, web sites. However, other ends are imagined, such as files, programs, applications, and the like, as those of skill in the art will readily appreciate. The CPS (and/or CPM) can be a tool that provides functionality to facilitate the distribution of content (whether as files, programs, applications, pages, etc.) to and from defined servers.

The CMP, for example, is a hands free tool (except where needed) that provides error checking and records or logs activities occurring during at least part of the CMP. It can record a person making a request to produce content, when such a request was made, what stage along the CMP the content currently resides, what files were added, deleted, and/or changed from any previous CMP content move, and so on. The CMP allows for the use of many different types of content and allows for a variety of different process moves.

Some of the different types of content can include hypertext markup language (HTML), active server pages (ASP), extensible markup language (XML), dynamic link libraries (DLL), and so on. The different process moves include moving content among stages in any conceivable permutation, depending on the need, where such stages include, by way of example and not limitation, a development state, a testing stage, a staging stage, a production stage, and the like.

Thus, according to one aspect of the present disclosure, a system is disclosed that seamlessly integrates a plurality of subsystems that in at least one combination of the plurality of subsystems process and produce content for web sites. Of course, those of skill in the art will readily appreciate that such systems and subsystems may be carried out as methods and steps within such methods, and that furthermore, such systems and subsystems may be stored as instructions on computer readable media, where such instructions are executable by computing devices, as those devices are explained in more detail, below.

For instance, the system can use a first subsystem that records at least one request for the production of content, where such at least one request is made in order to start the production of content for at least one web site. Such request can be recorded in order to determine when it was made, by whom it was made, for what purpose it was made, and so on. It should be noted that such a request can be made by an entity that includes and one of, or a combination of, a person, a plurality of people, computer program(s) and/or computing device(s). Thus, either human or non-human agents or subsystems can make requests for the processing and production of content, depending on the implementation.

A second subsystem can also be used that provides a development stage for the content, where the development stage includes the producing of code that at least in part serves as the basis for the content. This can mean that code can be developed by developers that will eventually be used in displaying the content of a final web page—for example. Such code can include HTML, ASP, and so on. During this stage, entities, whether developers or intelligent computing modules, can develop the necessary code to usher the content to the next stage, whether this stage is the testing stage, or the staging stage, or the production stage. This stage can also be used for importing code from elsewhere, so that it can be eventually tested or so that it can be further developed.

During the development stage, various collaborative efforts are allowed. Thus, developers from various places, organizations (or places within any given organizations), countries, and so on, can collaborate on the content, following the mentioned request. In one aspect of the presently disclosed subject matter, this stage (or any of the following stages, for that matter) does not have any temporal limitations as to how long content resides therein. Yet, in other aspects, such time limitations may be placed so that content moves smoothly along from one stage to the next stage. This much, as those of skill in the art will readily recognize, is merely an implementation detail.

Figure 2:
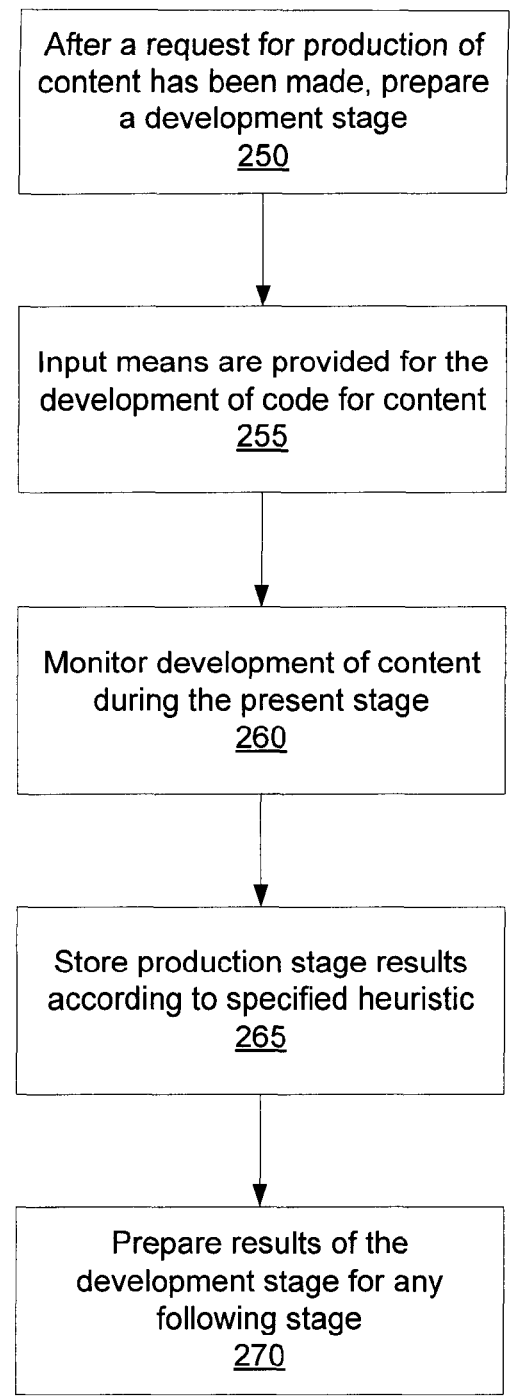
FIG. 2 illustrates a block diagram of aspects of a development stage of a publication framework.

Thus, per FIG. 2, a block diagram is shown for the development stage of the CPM. At block 250, after the mentioned request for production of content has been made, preparations are made for the development stage. This can entail the setting up of any templates, libraries, tools, and so on that will aid developing entities in brining the content to a web page. Following such preparations, at block 255, input means for development are provided, whether such means have certain restrictions as to who or what can develop code for content, or whether such means allow for collaborative effort in developing content.

As code is being developed, it can be monitored, per block 260, for instance to prevent any malicious code development, or to ensure quality control, or to ensure consistency with designated objectives. During this time, it can be stored according to various heuristics (daily, weekly, monthly, by the number of changes, by the types of changes, etc.), as is shown at block 265. Various versions of such code may be maintained, and certain preferred versions may be selected that work best according to some specified heuristics (how the content appear, how it functions, etc.). Thus, in short, block 260 shows that the development stage is monitored and block 265 shows that it is variously stored for the intended purpose designated by the overall system.

Lastly, once the code for the web site has been developed, it can be prepared for passage to the next stage (if any), as is shown at block 270. This can mean that whatever has been developed during this stage is packaged in the appropriate format for presentation to the next stage. For example, if during this stage various files and associated DLL files have been coded, such results are presented to the next stage, for instance, the testing stage, in a format appropriate for debugging. Once they have been debugged, they can be presented to the next stage in a compiled format, and so on.

Figure 3:
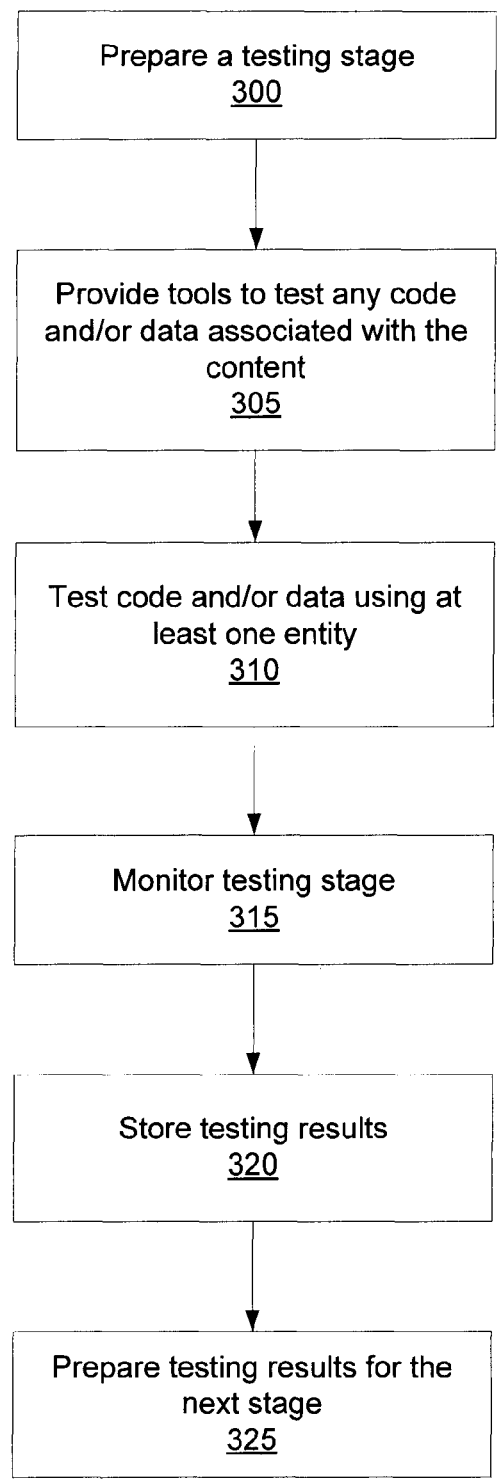
FIG. 3 illustrates a block diagram of aspects of a testing stage of the publication framework.

In another aspect of the presently disclosed subject matter, FIG. 3 shows that a third subsystem can be used, where such a subsystem provides a testing stage for the content, where the testing stage includes examining the content and determining whether the content is consistent with the intended goals of the content. In other words, during this testing stage, given that certain goals have been defined for the final web page, the content residing on the testing stage can be compared to the desired result or goal, and a determination can be made whether the content can be presented to the next stage. This determination can be made either by individuals testing any code associated with the content, or it can be made by some computing program and/or device.

Thus, at block 300, preparation is made for a testing stage. This preparation could entail placing any code (and/or data) for the content in a format to be tested, whether as individual files or the like. At block 305, tools can also be provided to test any cod and/or data associated with the content. Such tools may be coding platform, including debuggers and/or libraries with testing functions, sample input data, and the like.

Once the testing stage and the appropriate tools have been provided, at block 310, the code and/or data can be tested. As mentioned, the entity could be a an individual, a set of individuals, a computing program, or a set of computing programs (and/or devices using such programs). There may be temporal limitations as to how long testing may take place before the content is moved to the next stage, but in other implementations this may not be the case. Also, restrictions as to who can access the code and/or data for testing may also be put in place, so that only certified entities can engage in testing. And just as with the requests mentioned above, a log can be kept as to which entity is doing the testing (or for that matter, such a log can be kept for entities during any of the previously mentioned stages, for instance, the development stage, the staging stage, and the production stage).

At block 315, while the testing is being performed, it can be monitored so that it does not run afoul of any testing rules or heuristics, such as what code and/or data can be tested, when it can be tested, and by whom it can be tested. In alternative implementations, such monitoring can be performed before testing, so as to allow or disallow testing in the first place, and/or such monitoring can be performed after testing, so as to determine what was tested and by whom it was tested. Lastly, at block 325, any results of the testing stage can be prepared for any next stage. Thus, the correctly working code and/or data that has been vetted by various entities can be put in condition to be processed by a staging stage or a production stage, or any stage ready to receive such tested content.

Figure 4:
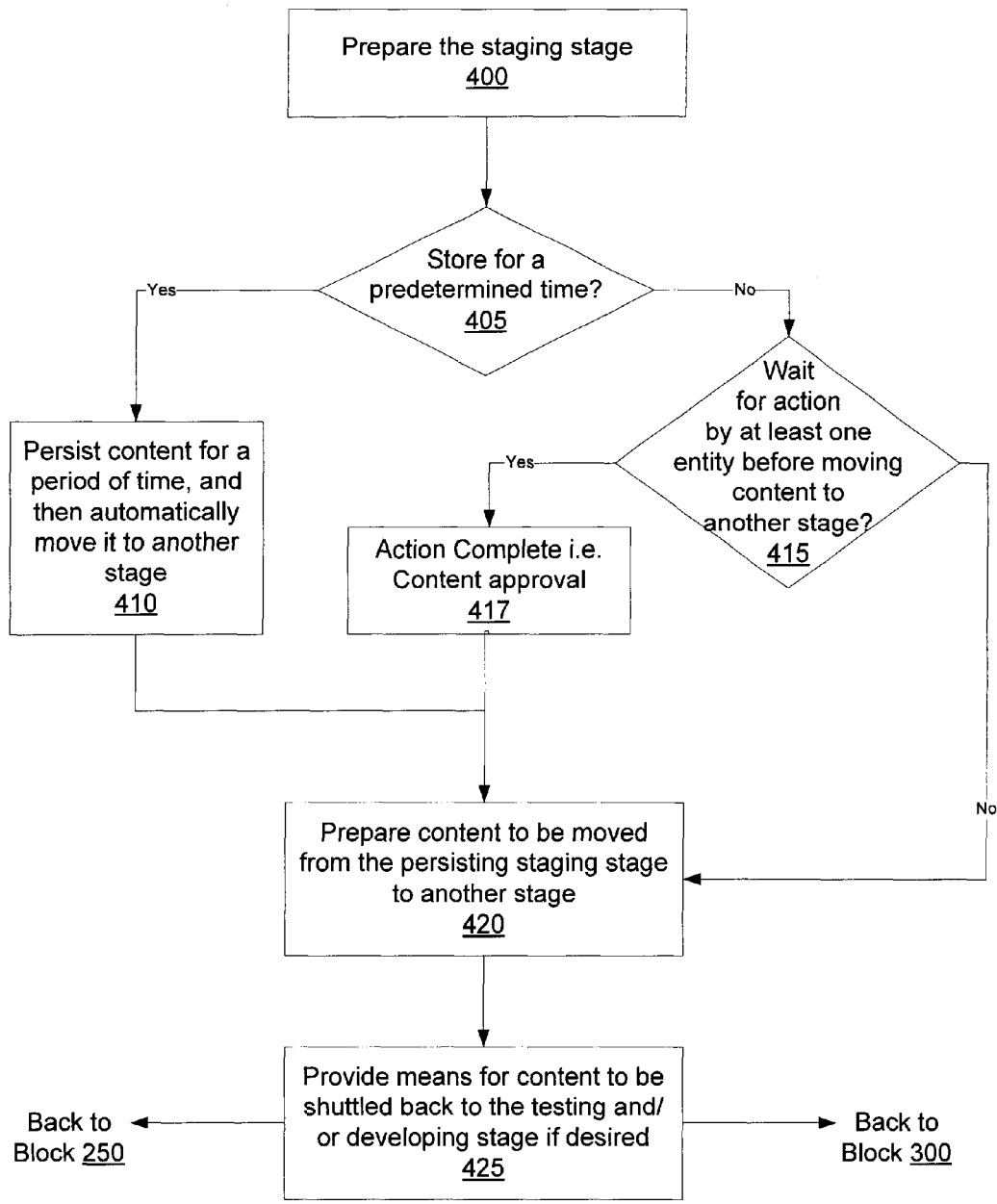
FIG. 4 illustrates a block diagram of aspects of a staging stage of the publication framework.

Next, FIG. 4 shows how a fourth subsystem can be used, where this subsystem provides a staging stage for the content, where the staging stage includes at least storing the content, whether for a predetermined period time, as in one implementation, or not, as in another implementation. As before with the other stages, at block 400, the staging stage is prepared to receive content. This can mean that the appropriate storage space, for instance, on a server, has been allocated to accommodate any arriving content.

At block 405, a decision can be made as whether to store the content for a predetermined amount of time. If so, content can be stored from a first time until a second time, say from 5 p.m. until 12 a.m. (at which point the content can be published, for example). Thus, at block 410 the stored content can be persisted in the staging stage, and after some predetermined amount of time, it can be automatically moved to another stage, such as a publishing stage. During the persistence time, content can be subject to inspection and the like by various entities.

Alternatively, at block 410, the content can be persisted until an action is performed by some entity. Thus, only after the content is selected and moved will it actually move. Such selection and moving can be performed by individuals or programs designed to move content according to various rules (e.g. rules that take into account the type of content that is to be moved or the conditions of content moving). In either case, whether block 410 or block 415, the content can be prepared to be moved to another stage, as is shown at block 420. In other words, it can be placed in the correct format, whether according to some file hierarchy or zip format, etc. It should be noted that at block 415, upon waiting for an action, once the action is complete, and the content can be approved, at block 417, and then prepared to be moved from the persisting staging stage to another stage (block 420).

Lastly, before such content is moved away from the staging stage, at block 425, some means can be provided, such as a moving mechanism or a copying mechanism for moving or copying code and/or data, to any other previous stages. For example, one previous stage might be the development stage established at block 250; another previous stage might be the testing stage established at block 300 (although, by no means do these stages have to be previous stages). Thus, for example, before the staged content in FIG. 4 is moved to a subsequent stage, such as a publishing stage, it can be moved back to any previous stage for the desired reasons (e.g. to develop more code and/or data or the test it more). A tracking mechanism can keep track as to at which stage the content resides, where it has been in the past, and where it likely to be shipped in the future (or in other implementations, where it should be moved or where it must be moved).

Figure 5:
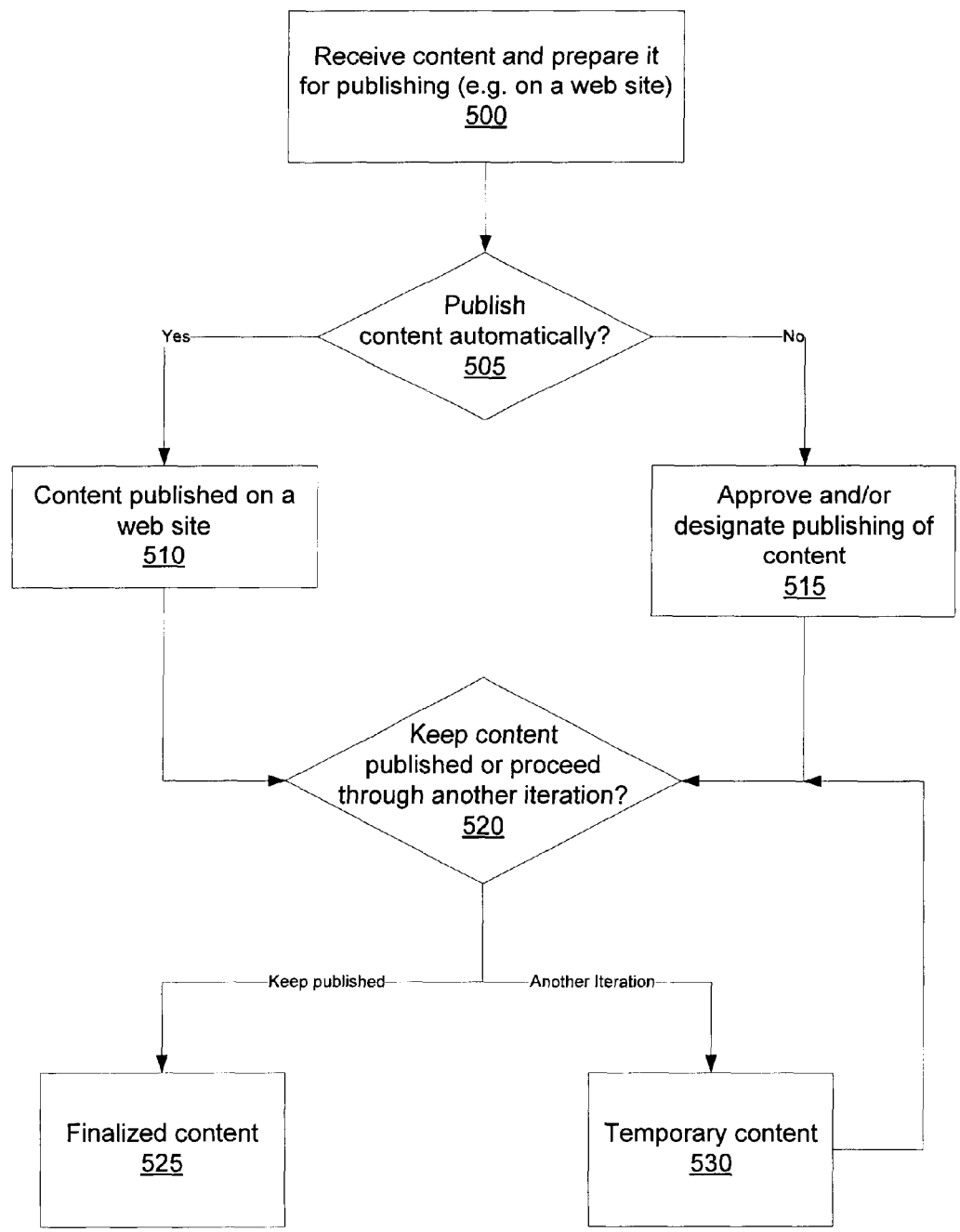
FIG. 5 illustrates a block diagram of aspects of a production stage of the publication framework.

FIG. 5 shows how a fifth subsystem can be used in order to provide a production stage for the content, where the production stage includes at least publishing the content in the form of a web site. Although, it should be understood, that it may be published in other forms as well: as a file, as content on a device (whether stationary or mobile), as email, as text message, and so on. In any event, at block 500, this content is received and put in condition to be published (it may be received by the production stage at any point in time from any other stage). However, before it is actually published, several intervening event may occur.

For example, a determination can be made, at block 505, whether such received content should be published automatically, as shown at block 510, or not, as shown at block 515. In the former case, content can be displayed on a web page, for example, as soon as it arrives from a previous stage, such as a staging stage. In the latter case, before such content is actually published, at block 520, it might first have to be approved first by some entity. Moreover, such content may also be designated as to where and when it is published, e.g., whether internally to a company, or externally to anyone with Internet access.

Once content is already published, it can be pulled back to any previous stage. For example, content may be taken down from a web site and be subjected to more testing, more development, and so on. Thus, several iterations may exists—iterations between stages—before the final content is realized. Thus, at block 520, a determination is made whether to keep content published or whether to proceed through another iteration. If the former case, at block 525, the content is finalized and it will stay as such (until another request is made to change it). In the latter case, at block 530, the content can keep on being developed, tested, and published, iteratively, until the finalized web site it obtained. A loop from block 530 back to block 520 illustrates this notion.

Figure 6:
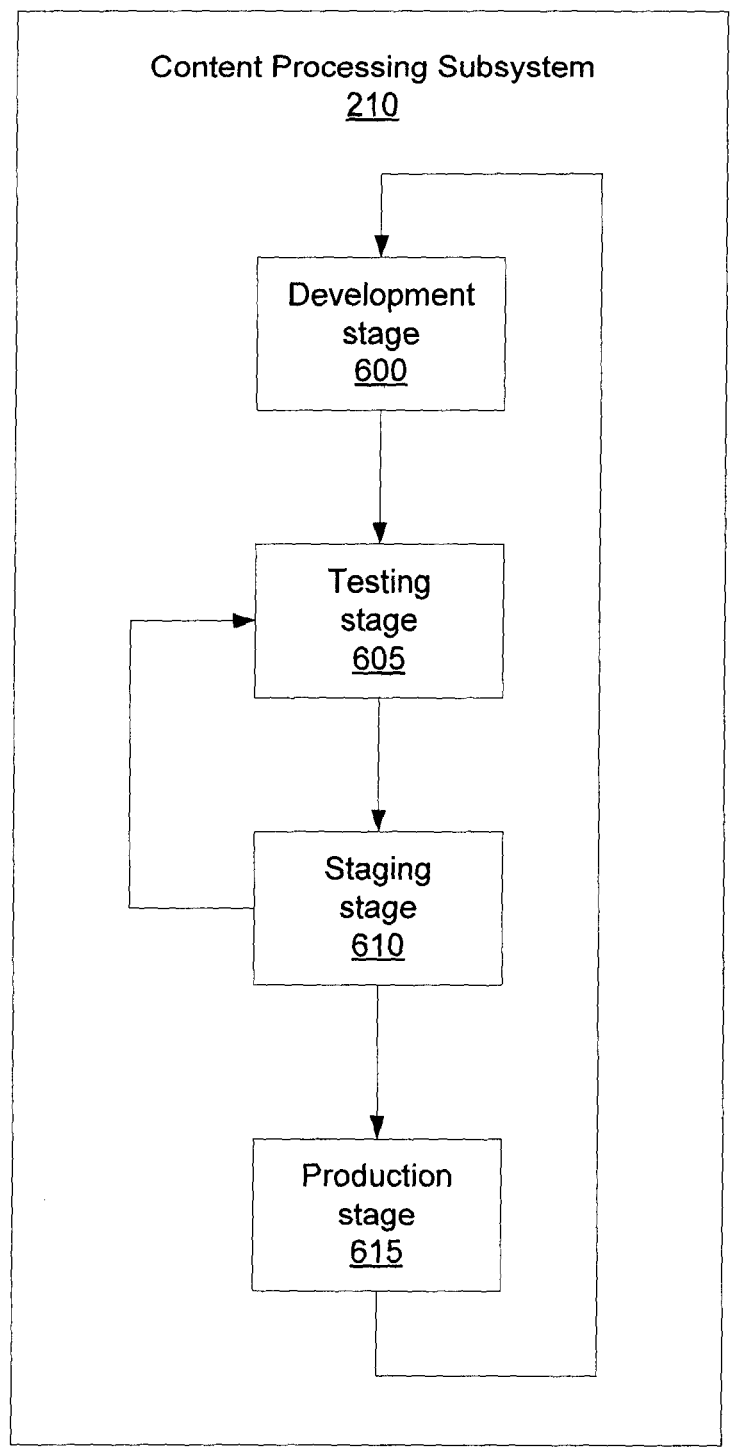
FIG. 6 illustrates that content processing is flexible and can occur in a variety of permutations, whether executing in standard sequence such as development-testing-staging-production, or in different sequences that allow content to be shared between any two stages.

Thus, FIG. 6 shows that the flow of code and/or data can occur variously between stages and is not limited to any single sequence. One typical sequence can be from a development stage 600, to a testing stage 605, to a staging stage 610, and to a production stage 615. However, content can also move back (a plurality of times) to different stages, such as moving from the production stage 615 back to the testing stage 605, or to the development stage 605, or to any other desired stage. Those of skill in the art will readily appreciate the plurality of different sequence permutations that flow of code and/or data could take between stages.

Figure 7:
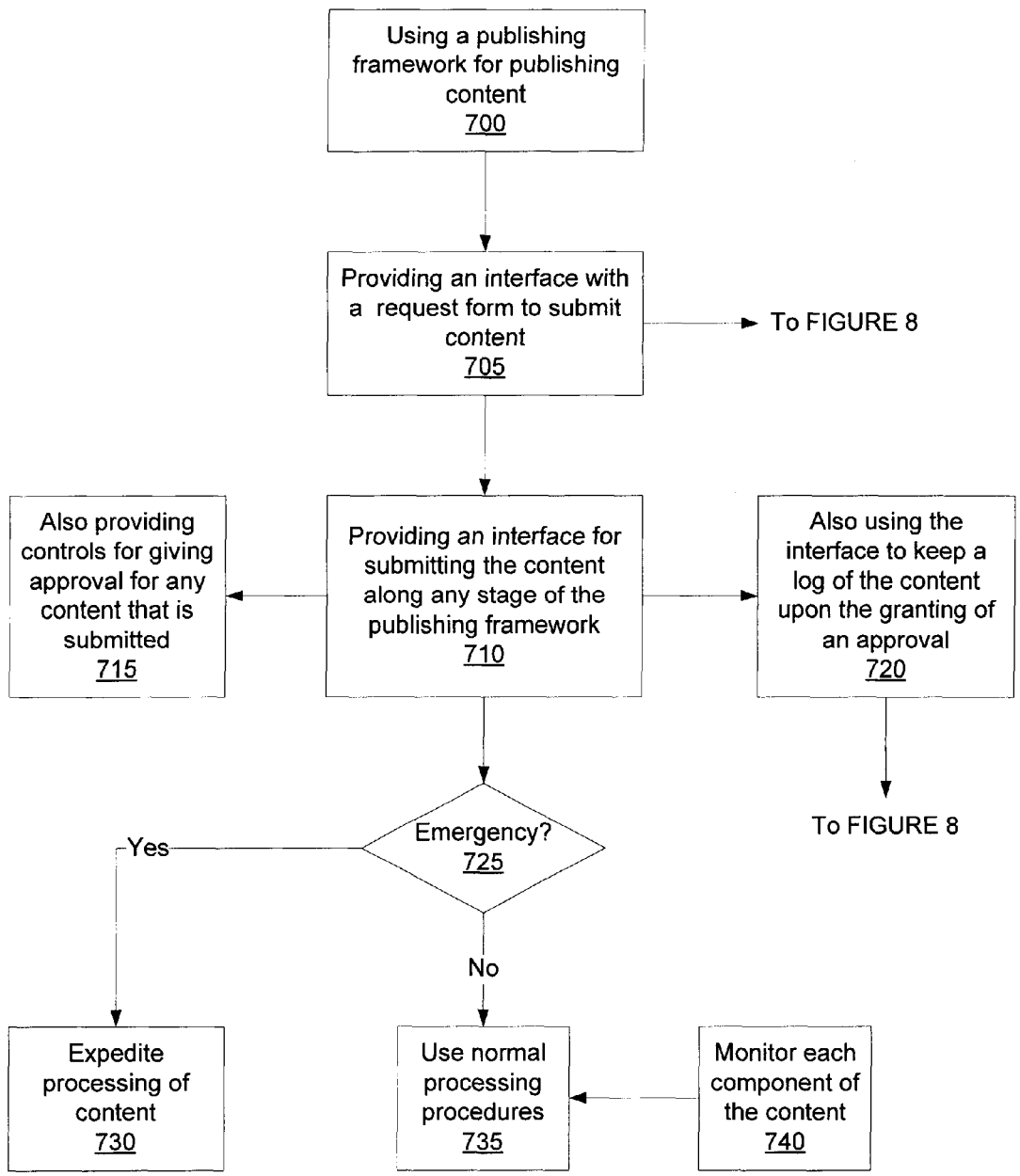
FIG. 7 illustrates a block diagram of aspects of various interfaces that can be used in the publication framework.

In another aspect of the presently disclosed subject matter, content can be at least semi-automatically moved along a publishing framework. In other words, users need have only minimal interaction with an interface, and the rest of the work will be automatically provided by the publishing framework. Thus, as is shown in FIG. 7, at block 700, a first a publishing framework is used for publishing the content, where the framework includes a development stage, a testing stage, a staging stage, and a production stage—per the discussion above with respect to FIGS. 1-6. Next, at block 705, an interface with a request form to submit content is provided to an entity wanting to publish content using the framework. Once this request form is filled out, then, at block 710, an interface is provided for submitting the content along any stage of the publishing framework, including the development stage, the testing stage, the staging stage, and the production stage. The interface also provides controls for giving approval for any content that is submitted, at block 715, and the interface also keeps a log of the content upon the granting of an approval to publish content, at block 720. This log can keep track of as to what is happening during the semi-automatic process executing in the publishing framework.

At block 725, entities are inquired whether the submission of content is an emergency or not. If so, than at block 730, the processing of the content is expedited. This could mean that certain approvals don't have to be obtained, that certain stages can be skipped (e.g. going from the development stage straight to the publishing stage, thereby obviating the testing and staging stages). However, if the submission is not an emergency, at block 735, normal processing procedures are used (as they have been described above).

It should be apparent from the separation of blocks 705, 710, and 715 that the interface includes a separate access point for making a request to publish content (block 705), and a separate access point for making said approval to publish content (block 715). The actual content submission interface (block 710) can have the same or separate access point as that of the request form (block 705), depending on the implementation. One reason for such separate access points (e.g. different log-ins on the same computing device, or a different computing devices altogether) is that entities that request to submit content and submit content may be different from entities that are charged with approving that content. Such separation can ensure that only content that is approved by the appropriate entities will enter the publishing framework.

It should be noted that a subsystem can be used with the subject matter discussed so far that monitors the content and disallows the publishing of the content if any component of the content fails at least one designated heuristic. For example, if one web page of a set of web pages contains the wrong content, the whole set may be jettisoned from publication. Such monitoring, at block 740, can be part of the normal processing procedures, at block 735.

Figure 8:
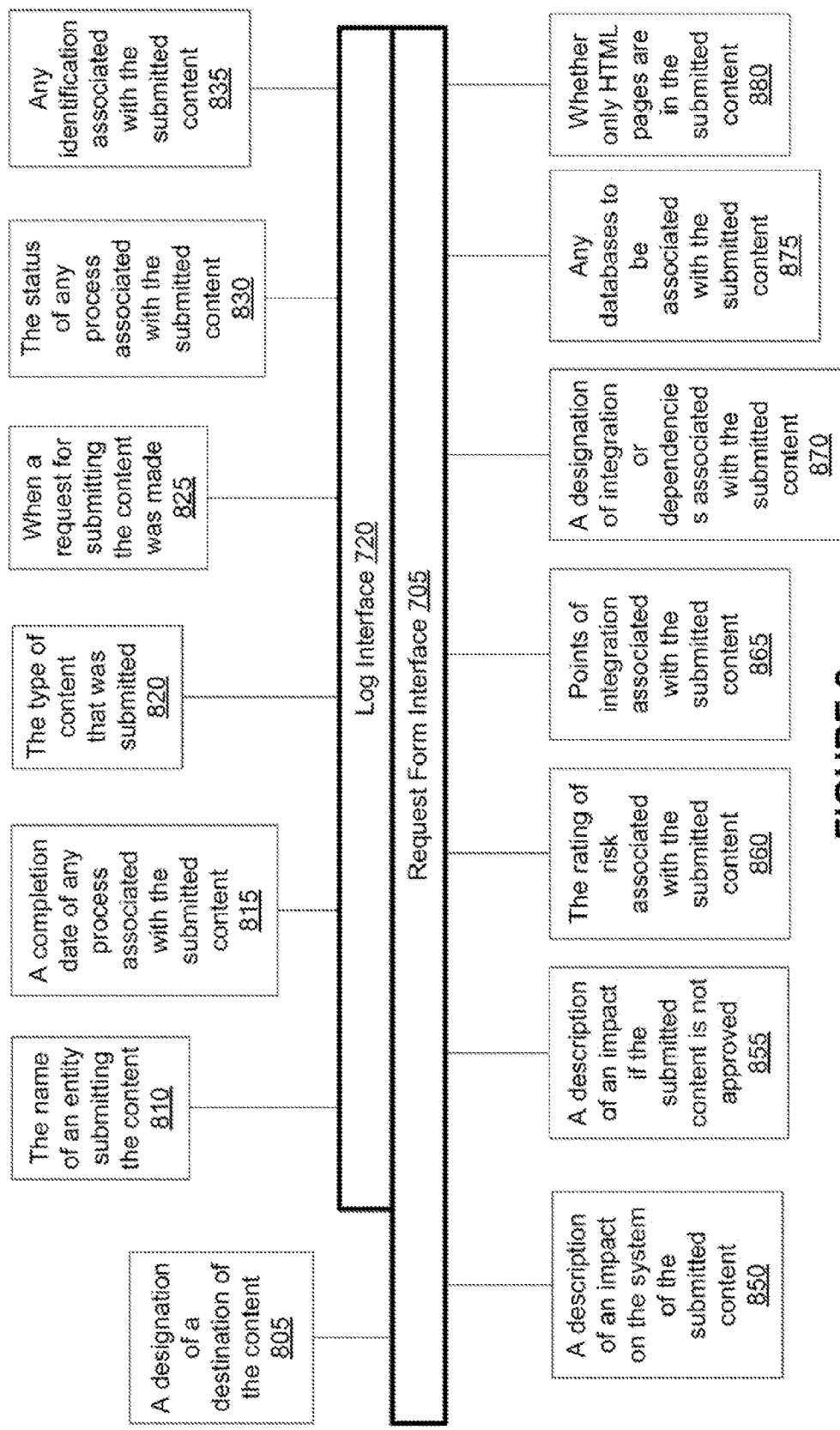
FIG. 8 illustrates in more detail the FIG. 7 interfaces, namely, some of the interface components.

Now turning to FIG. 8, various other aspects of the above discussed interface are shown. The request form interface shown at block 705 (in FIG. 7) is expanded in more detail in FIG. 8; similarly, the log interface shown at block 720 (in FIG. 7) is expanded in more detail in FIG. 8. Thus, the request form interface 705 has at least the following components, any one of which can be selected by an entity: a description of the impact on the system of the submitted content (850), a description of the impact if the submitted content is not approved (855), the rating of risk associated with the submitted content (860), points of integration of the system and the submitted content (865), a designation of integration or dependencies associated with the submitted content (870), any databases to be associated with the submitted content (875), and whether only HTML pages are in the submitted content (880). Also, since the submitting of the content can be preceded by a request to submit the content, the request can include a designation of a destination of the content (805), where the destination includes at least one of the development stage, the testing stage, the staging stage, and the production stage.

The log interface 720, on the other hand, has at least the following components, any one of which can be selected by an entity: the name of an entity submitting the content (810), a completion date of any process associated with the submitted content (815), the type of content that was submitted (820), when a request for submitting the content was made (825), the status of any process associated with the submitted content (830), and any identification associated with the submitted content, such as some id number (835).

Figure 9:
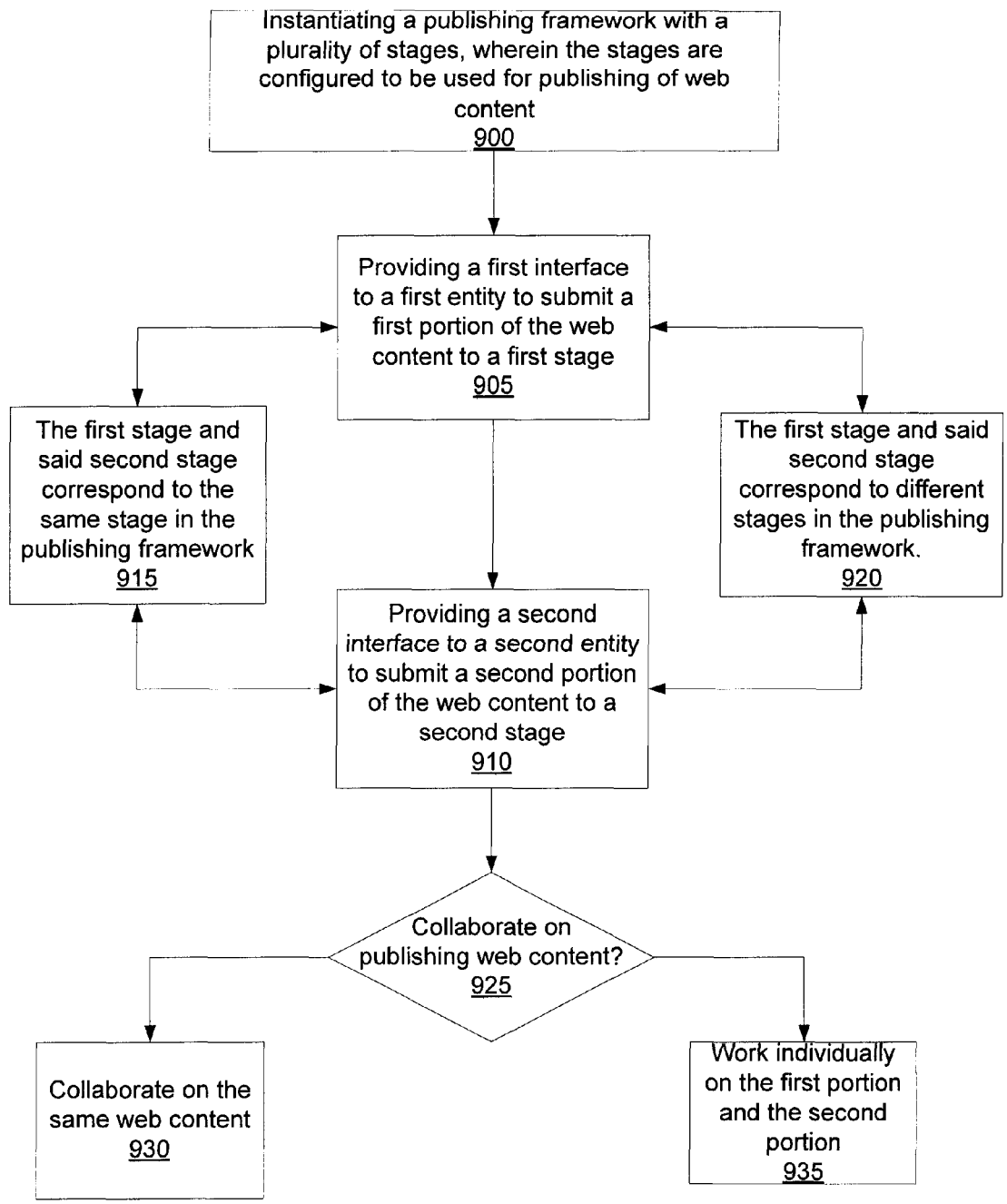
FIG. 9 illustrates how entities can collaborate using the framework.

In another aspect of the presently disclosed subject matter, the publishing of web content is disclosed, wherein such publishing can done in a collaborative fashion on an enterprise level—for example (it is certainly not limited to an enterprise, but rather could span a plurality of enterprises). Turning now to FIG. 9, a block diagram is shown for the publishing of web content in a collaborative fashion. At block 900, a publishing framework with a plurality of stages is instantiated, wherein the stages are configured to be used for publishing of the web content. Then, at block 905, a first interface is provided to a first entity to submit a first portion of the web content, per the discussion above regarding FIGS. 1-8. Then, at block 910, a second interface is provided to a second entity to submit a second portion of the web content. These interfaces allow various entities to collaborate on any give web content project (or any other kind of project, as was discussed above—web content is merely exemplary and non-limiting).

The first entity and the second entity can collaborate on the publication of the web content using the publishing framework by submitting the first portion of the web content to a first stage in the plurality of stages, and the second portion of the web content to a second stage in the plurality of stages.

Depending on the state of the collaboration, the first stage and the second stage can correspond to the same stage in the publishing framework, as is shown at block 915, or in the alternative, the first stage and the second stage can correspond to different stages in the publishing framework, as is shown at block 920. Theses stages can include at least one of (a) a development stage for developing web content, (b) a testing stage for testing web content, (c) a staging stage for storing web content, and (d) a production stage for publishing web content. Other stages are contemplated herein also. These stages can either reside on a distributed network within said enterprise (i.e. a network of local area networks separated by a wide area network). Alternatively, by default they can reside on a centralized enterprise network. In certain implementations, at least one of the plurality of aforementioned stages can resides outside the enterprise (again, in contrast to the model where all the stages reside in the same enterprise—which would be an alternative implementation).

At block 925, given that a framework and setup has been put in place for collaborating on the publishing of web content, an inquiry can be made as to whether entities want to collaborate in the first place. If so, at block 930, they can collaborate on the same content, or in the alternative, at block 935, they can work individually on separate web content. The publishing framework supports numerous users developing, testing, staging, and publishing content at the same time, whether working on the same content or different content. Moreover, entities can collaborate such that a first entity can uses a stationary computing device, such as a desktop, and a second entity can use a mobile computing device, such as a cell phone, personal digital assistant, and so on.

Computing and Networking Environment for System and Methods for Content Move

Figure 10:
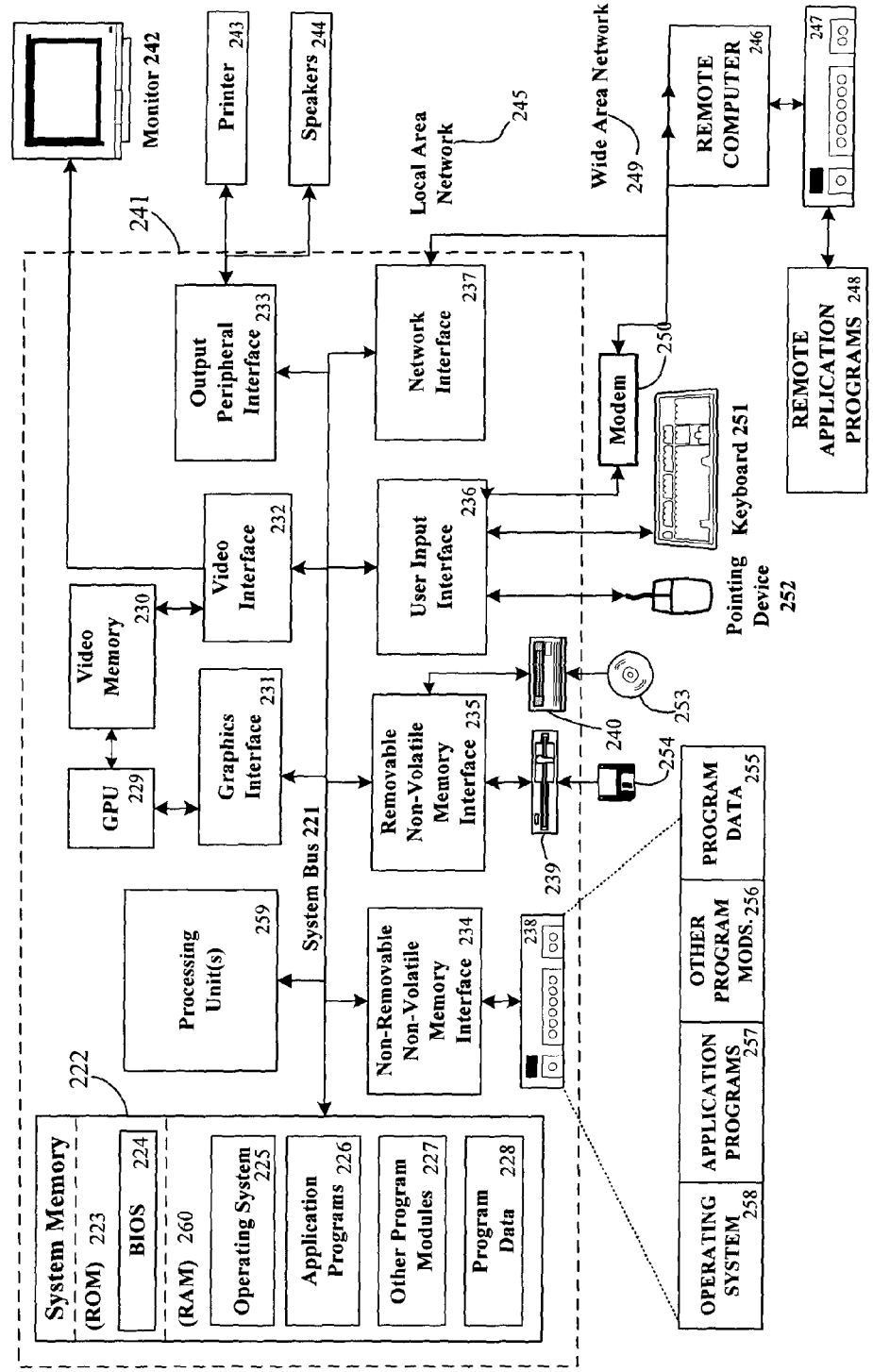
FIG. 10 illustrates a block diagram representing an exemplary computing device suitable for use in conjunction with the aforementioned aspects.

Next, referring to FIG. 10, shown is a block diagram representing an exemplary computing device suitable for use in conjunction with implementing the systems and methods described above. For example, computer executable instructions are disclosed that can carry out the processes and methods for moving content along the aforementioned publishing framework They may reside and/or be executed in such a computing environment as shown in FIG. 10. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220.

Aspects of the presently disclosed subject matter are operational with numerous other general purpose or special purpose computing system environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 10 illustrates operating system 225, application programs 226, other program modules 227, and program data 228.

The computer 241 may also include other removable/non-removable, volatile/nonvolatile computer storage media. By way of example only, FIG. 10 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 10, provide storage of computer readable instructions, data structures, program modules and other data for the computer 241. In FIG. 10, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 10. The logical connections depicted in FIG. 10 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 10 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 10, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 11:
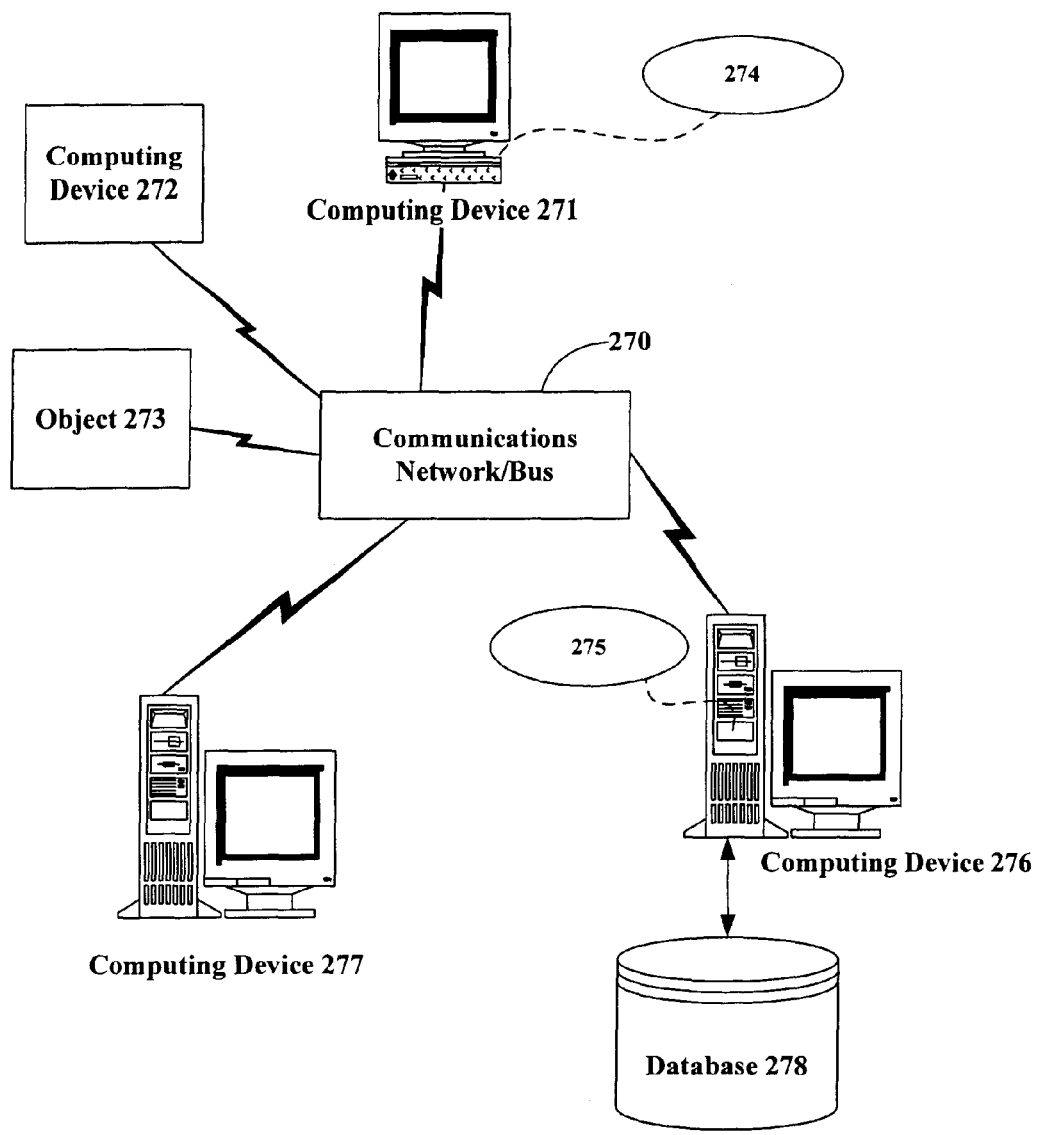
FIG. 11 illustrates an exemplary networked computing environment in which many computerized processes may be implemented to perform the aforementioned aspects.

Referring next to FIG. 11, shown is an exemplary networked computing environment in which many computerized processes may be implemented to perform the processes described above. For example, parallel computing may be part of such a networked environment with various clients on the network of FIG. 11 using and/or implementing the defining and extracting of a flat list of search properties from a rich structured type. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 11 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 11, and may itself represent multiple interconnected networks. In accordance with an aspect of the presently disclosed subject matter, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 11, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 11 and the further diversification that can occur in computing in a network environment such as that of FIG. 11, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, processes and methods were described at least for remote deposit of negotiable instruments to non-payee financial institutions, for clearing negotiable instruments without digital images, and for displaying negotiable instruments from various sources. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A non-transitory computer readable storage medium storing thereon computer executable instructions for development of web content, wherein said instructions are executed to:

record at least one request for production of web content, wherein said at least one request is made via a request form interface in order to start the production of content for at least one web site by submitting the at least one request and wherein said at least one request includes a designation of a destination of the content and said request form interface includes selectable components at least of: a description of an impact if said content is not approved, a risk rating associated with the content, and a description of points of integration associated with the content;

provide a stage for development of code that at least in part serves as the basis for said content, wherein a number of versions of said code are stored according to a number of heuristics associated with changes to the code and a preferred version of the number of versions of said code is selected for passage to a next stage according to how said content functions;

provide a stage for the testing of said code;

store said content for a predetermined period time during a staging stage;

publish said content in a form of said at least one web site, when said content has arrived at a publishing stage; and via a second interface, track said content and log a stage said code is currently in, a stage said code has previously been in, and a stage the code is likely to be in at a future time;

wherein the second interface enables submitting said content along any stage of said development stage, said testing stage, and said publishing stage;

inquire of a requesting entity whether there is an emergency associated with the at least one request;

receive in response to the inquiry, via the second interface, an indication of the emergency associated with the at least one request; and expedite a processing of the content associated with the emergency according to the indication, wherein expediting includes omitting, without an approval, at least one of the stage for development of said code, the stage for the testing of said code, the staging stage, and the publishing stage.

2. The computer readable storage medium according to claim 1, further comprising of recording when said at least one request is made.

3. The computer readable storage medium according to claim 1, further comprising using at least one entity during at least one of (a) said development stage, (b) said testing stage, (c) said staging stage, and (d) said publishing stage, wherein said at least one entity is one of (1) a person and (2) a computing device and (3) a computing program.

4. The computer readable storage medium according to claim 1, further comprising proceeding through a plurality of iterations of a process for producing said content, beginning with said development stage, followed by said testing stage, followed by said staging stage, and followed by said publishing stage.

5. The computer readable storage medium according to claim 4, further comprising tracking any differences in content between each iteration of said plurality of iterations.

6. The computer readable storage medium according to claim 1, further comprising providing for said content to be moved to said publishing stage at any time when such content is at any of other stages.

7. A non-transitory computer readable storage medium storing computer executable instructions for publishing web content, said instructions executed to:
   utilize a publishing framework for publishing said web content, wherein said framework includes:
      a development stage, wherein a number of versions of code are stored according to a number of heuristics associated with changes to the code and a preferred version of the number of versions of the code is selected for passage to a next stage according to how the code functions,
      a testing stage for testing the code,
      a staging stage for storing said content for a predetermined period time, and
      a production stage for publishing said content in the form of at least one web site;
   record at least one request for production of said web content, wherein said at least one request is made via a request form interface in order to start the production of content for said at least one web site by submitting the at least one request and wherein said at least one request includes a designation of a destination of the content and said request form interface includes selectable components at least of: a description of an impact if said content is not approved, a risk rating associated with the content, and a description of points of integration associated with the content;
   via a second interface, track the content and log a stage said code is currently in, a stage said code has previously been in, and a stage the code is likely to be in at a future time;
   wherein said second interface for submitting said content along any stage of said publishing framework, including said development stage, said testing stage, said staging stage, and said production stage;
   inquire of a requesting entity whether there is an emergency associated with the at least one request;
   receive in response to the inquiry, via the second interface, an indication of the emergency associated with a submission of content;
   expedite a processing of the content associated with the emergency according to the indication, wherein expediting includes omitting, without an approval, at least one of the development stage, testing stage, the staging stage, and the production stage; and
   wherein said second interface also provides controls for giving approval for any content that is submitted, and wherein said interface keeps a log of said submitted content upon the granting of said approval.

8. The computer readable storage medium according to claim 7, wherein said log includes at least one of (a) a name of an entity submitting said content, (b) a completion date of any process associated with said submitted content, (c) a type of content that was submitted, (d) when a request for submitting said content was made, (e) the status of any process associated with said submitted content, and (f) any identification associated with said submitted content.

9. The computer readable storage medium according to claim 7, wherein said destination includes at least one of said development stage, said testing stage, said staging stage, and said production stage.

10. The computer readable storage medium according to claim 9, wherein said request form interface further includes at least one of (a) a description of an impact on a system of said submitted content, (b) a designation of integration or dependencies associated with said submitted content, (c) any databases to be associated with said submitted content, and (d) an indication of whether only HTML pages are in said submitted content.

11. The computer readable storage medium according to claim 7, wherein said request form interface includes a separate access point for making a request to publish the content and a separate access point for making said approval to publish the content.

12. The computer readable storage medium according to claim 7, further comprising monitoring said content and disallowing the publishing of said content if any component of said content fails at least one designated heuristic.

13. A non-transitory computer readable storage medium storing computer executable instructions for publishing web content in a collaborative fashion, said instructions executed to:
   receive requests made via a request form interface for publishing said web content, wherein said requests include a designation of a destination of the content and said request form interface includes selectable components at least of: a description of an impact if said content is not approved, a risk rating associated with the content, and a description of points of integration associated with said content;
   instantiate a publishing framework with a plurality of stages configured to be used for publishing of said web content including:
      a development stage, wherein a number of versions of code are stored according to a number of heuristics associated with changes to the code and a preferred version of the number of versions of the code is selected for passage to a next stage according to how the code functions,
      a testing stage for testing the code,
      a staging stage for storing said content for a predetermined period of time, and
      a production stage for publishing said content in the form of at least one web site;
   record the requests,
   via a content submission interface, track the content and log a stage said code is currently in, a stage said code has previously been in, and a stage the code is likely to be in at a future time;

provide a first interface to a first entity to submit a first portion of said web content;
provide a second interface to a second entity to submit a second portion of said web content;
inquire of a requesting entity whether there is an emergency associated with the requests;
receive in response to the inquiry, via one of the first user interface and the second user interface, the indication of an emergency associated with one of the submitted first portion and submitted second portion;
expedite a processing of the content associated with the emergency according to the indication, wherein expediting includes omitting, without an approval, at least one of the plurality of stages; and
accept submissions of said first portion of said web content to a first stage of said plurality of stages, and said second portion of said web content to a second stage of said plurality of stages.

14. The computer readable storage medium according to claim 13, wherein said first stage and said second stage correspond to the same stage in said publishing framework.

15. The computer readable storage medium according to claim 13, wherein said first stage and said second stage correspond to different stages in said publishing framework.

16. The computer readable storage medium according to claim 13, wherein said plurality of stages reside on a distributed network within an enterprise.

17. The computer readable storage medium according to claim 13, wherein at least one of said plurality of stages resides outside an enterprise.

18. The computer readable storage medium according to claim 13, wherein said collaboration takes place such that said first entity uses a stationary computing device and said second entity uses a mobile computing device.

* * * * *